Aug. 18, 1953  H. P. LUHN  2,649,513
DISTRIBUTOR AND METHOD FOR MAKING THE SAME
Filed March 8, 1949  7 Sheets-Sheet 1
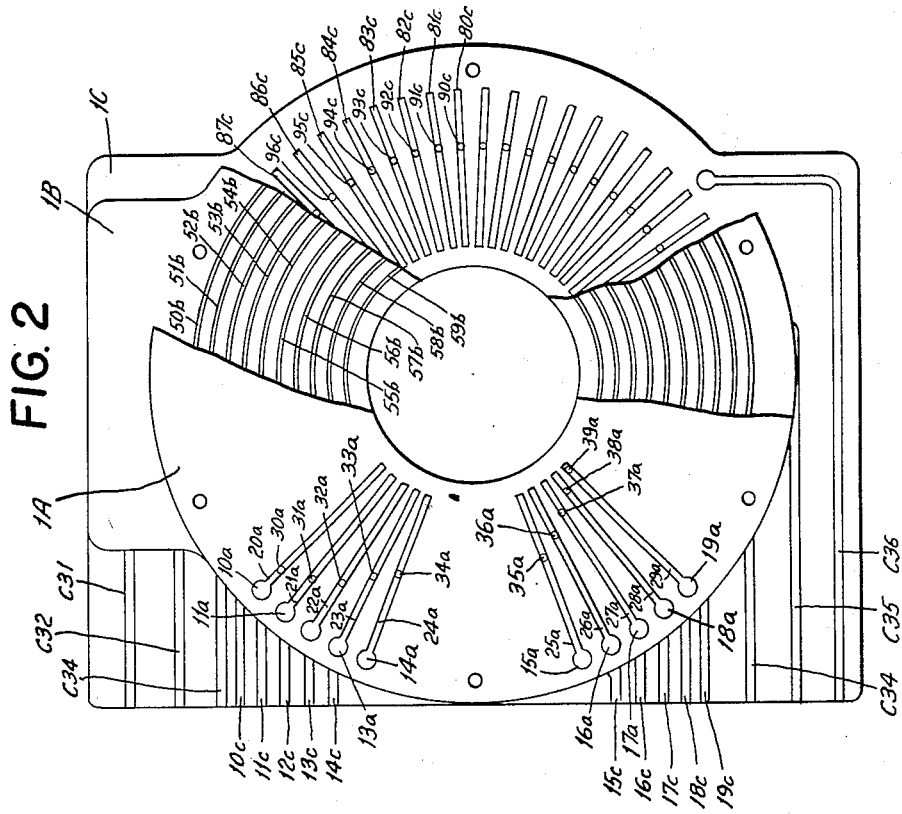
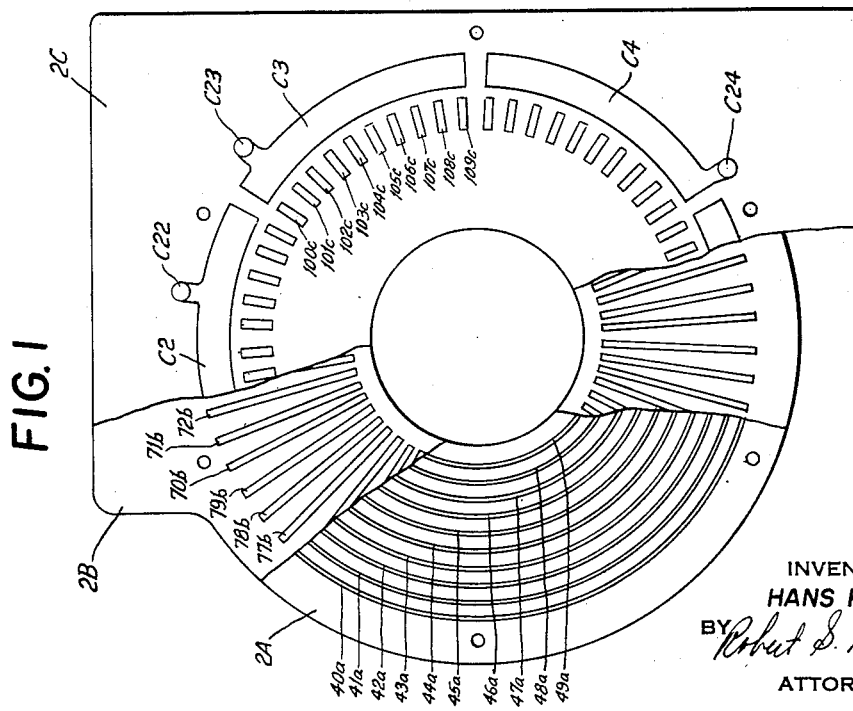
INVENTOR
HANS P. LUHN
BY Robert S. Dunham
ATTORNEY Aug. 18, 1953 H. P. LUHN 2,649,513
DISTRIBUTOR AND METHOD FOR MAKING THE SAME
Filed March 8, 1949 7 Sheets-Sheet 3
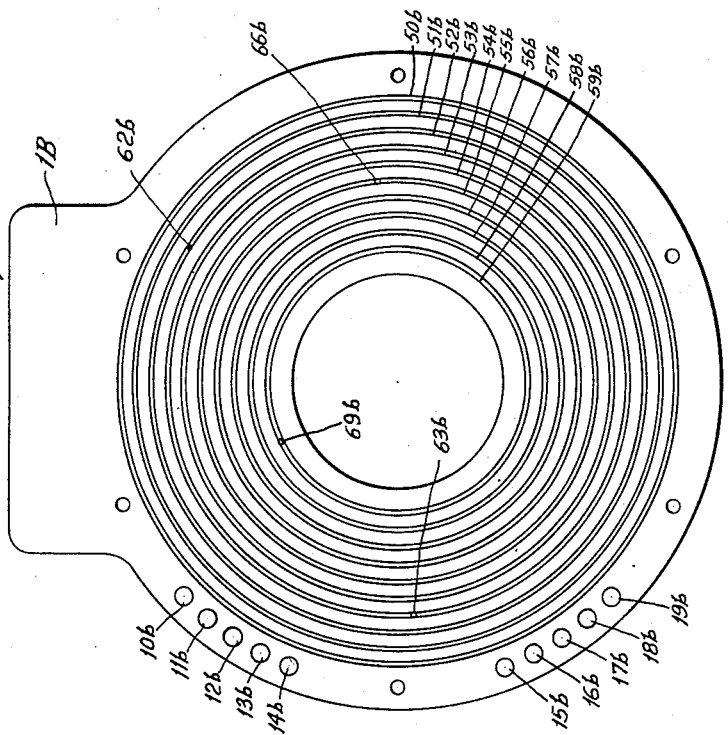
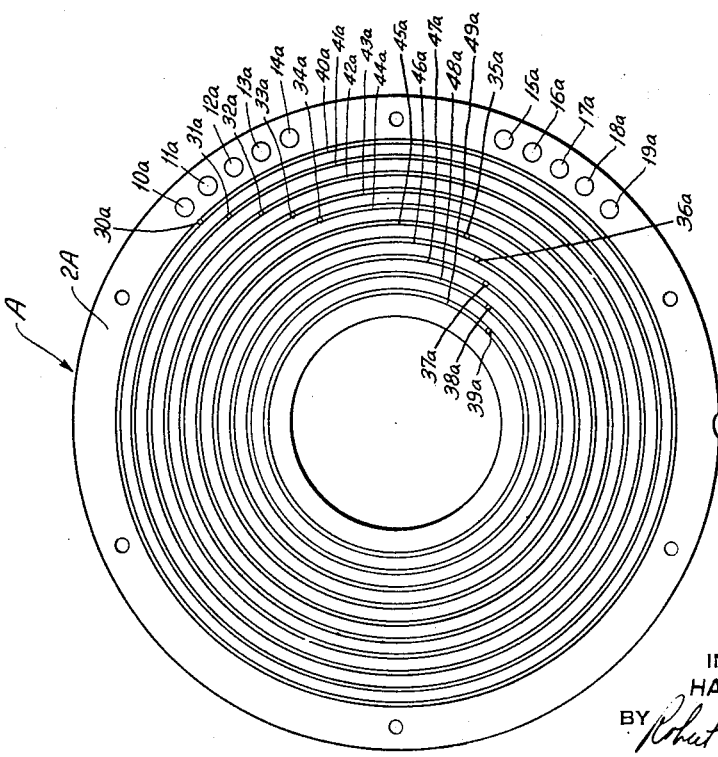
INVENTOR
HANS P. LUHN
BY *Robert S. Dunham*
ATTORNEY Aug. 18, 1953  H. P. LUHN  2,649,513
DISTRIBUTOR AND METHOD FOR MAKING THE SAME
Filed March 8, 1949  7 Sheets-Sheet 4
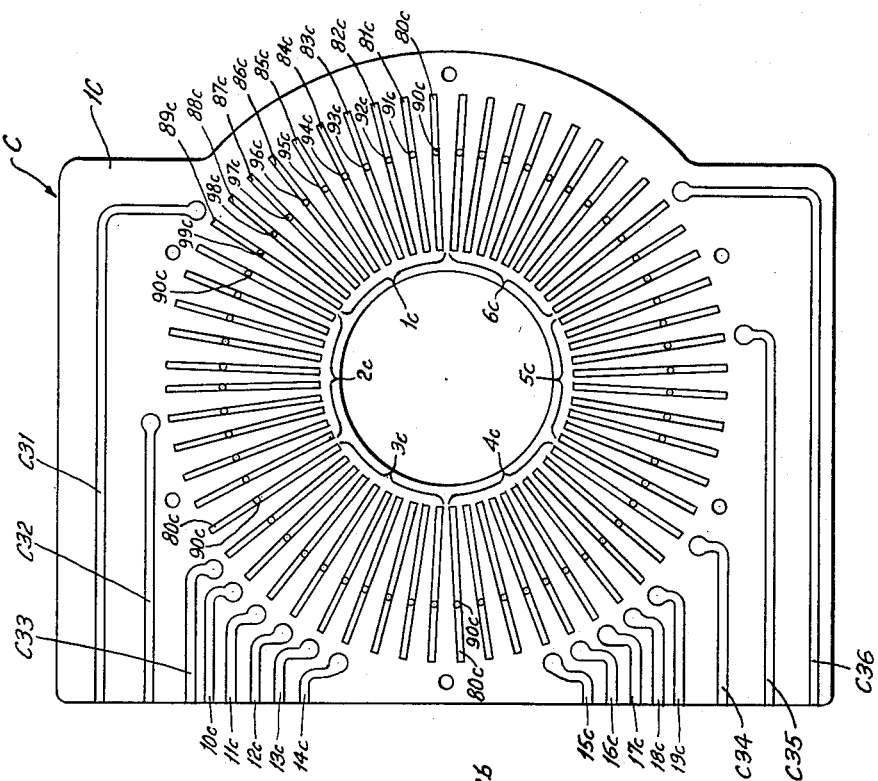
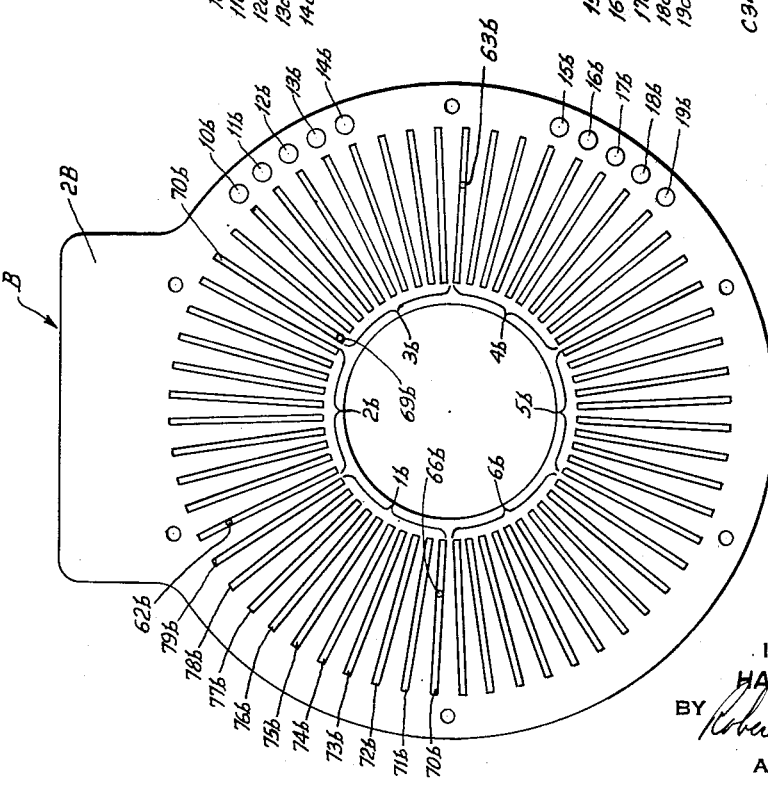
INVENTOR
HANS P. LUHN
BY Robert S. Dunham
ATTORNEY Aug. 18, 1953  H. P. LUHN  2,649,513
DISTRIBUTOR AND METHOD FOR MAKING THE SAME
Filed March 8, 1949  7 Sheets-Sheet 5

INVENTOR.
HANS P. LUHN
BY Robert S. Dunham
ATTORNEY.

Aug. 18, 1953  H. P. LUHN  2,649,513
DISTRIBUTOR AND METHOD FOR MAKING THE SAME
Filed March 8, 1949  7 Sheets-Sheet 6
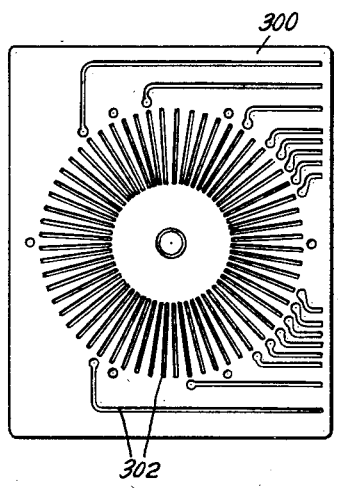
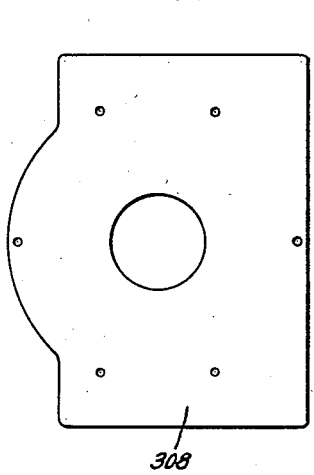
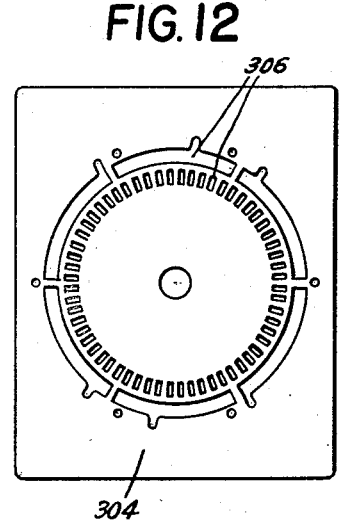
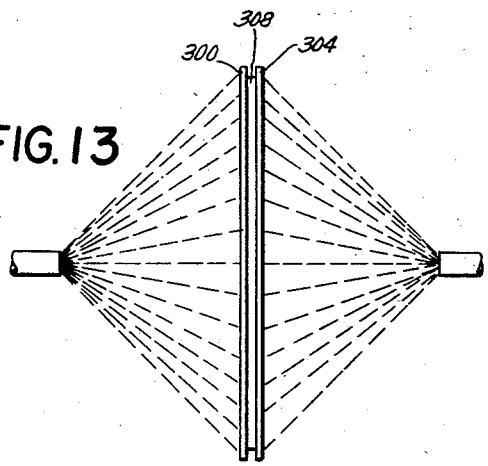
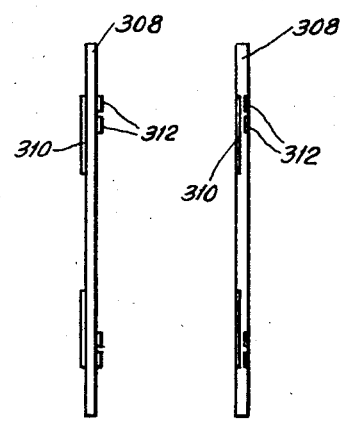
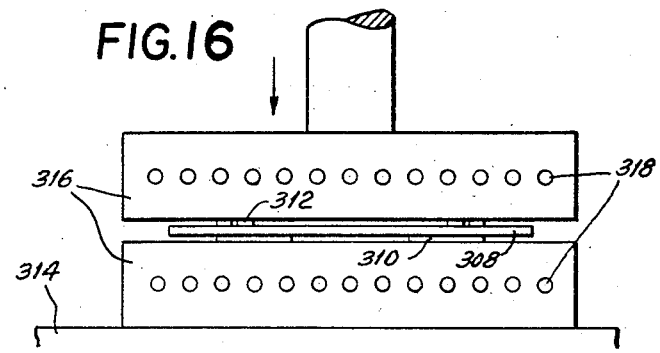
INVENTOR
HANS P. LUHN
BY Robert S. Dunham
ATTORNEY Patented Aug. 18, 1953

2,649,513

UNITED STATES PATENT OFFICE 2,649,513

DISTRIBUTOR AND METHOD FOR MAKING THE SAME

Hans P. Luhn, Armonk, N. Y., assignor to International Business Machines Corporation, New York, N. Y., a corporation of New York Application March 8, 1949, Serial No. 80,266

12 Claims. (Cl. 200—11)

This invention relates to a distributor and to the method for making the same. More particularly, the invention relates to a distributor capable of transposing electrical impulses from a position in point of time to a position in point of space.

It is an object of this invention to provide a distributor for controlling the operating sequence of electrically responsive instrumentalities forming a part of automatic computing and tabulating machines. Thus, the distributor may be used to control the printing magnets in the printing tabulator of the C. D. Lake U. S. Patent No. 1,976,617.

It is a further object of the invention to provide a distributor designed to receive sequentially timed energizing impulses and pass such impulses in a predetermined fixed order for the control of current responsive devices. As such, the distributor constitutes a means for storing numerical or alphabetical data by providing therein fixed conductors conditioned for the predetermined orderly control of instrumentalities representative of such numerical or alphabetic data.

It is a further object of the invention to constitute a distributor of the kind indicated of a minimum number of parts, so that the manufacture and installation of the same is facilitated.

It is a further object of the invention to provide a method for making multi-component distributors and parts thereof.

It is also an object of this invention to provide improved current distributors that are formed by depositing current conducting paths on a dielectric supporting base, and in this regard certain improved method procedures are contemplated herein.

In connection with the method described herein, it is an object to provide a distributor or other electrical circuit component of the deposited metal type which will present a smooth contact face for cooperation with a movable part such as a wiper brush, whereby a good electrical contact is provided and the contacting parts subject to movement therebetween, as between a fixed contact and a movable wiper, are protected against undue wear during their operation.

Furthermore, it is an important object of the invention to provide improved durable deposited circuit paths on a supporting base, and particularly deposited circuit paths in firmly bonded relation to their supporting base.

It is also an object hereof to provide a circuit element of the type indicated wherein current conductors are disposed in a unitary supporting body, and the method disclosed herein contemplates the production of current conducting elements composed of a plurality of components disposed in spaced planes within a unitary supporting body.

Further objects and advantages of the invention will appear as the following detailed specification is read with reference to drawings forming a part hereof, and in which drawings:

Fig. 1 is a plan view taken from the outer face of the distributor forming a part of this invention, successive components having been broken away to show underlying structure;

Fig. 2 is a plan view taken from the inner face of the distributor, successive components having been broken away to show underlying structure;

Fig. 5 is a plan view of the outer face of the bus plate component shown in Fig. 4;

Fig. 6 is a plan view of the inner face of a circuit pattern component;

Fig. 7 is a plan view of the outer face of the circuit pattern component shown in Figure 6;

Fig. 8 is a plan view of the inner face of the pluggable wiper plate shown in Fig. 3;

Fig. 10 is a plan view of a circuit path depositing mask;

Fig. 11 is a plan view of a plate-like non-conducting element forming the base of component structure;

Fig. 12 is a plan view of a circuit path depositing mask of a different kind;

Fig. 13 is a side elevational view of a component base impressed between two conducting path depositing masks disposed in the path of a pair of metal spraying nozzles;

Fig. 14 is a fragmentary side elevational view of a component after impulse conducting paths have been deposited thereon;

Fig. 15 is a view similar to Fig. 14, but shows the manner in which circuit paths have been embedded in the component base by application of pressure;

Fig. 16 is a fragmentary view of a press having between the plates thereof a circuit element component;

Figure 4:
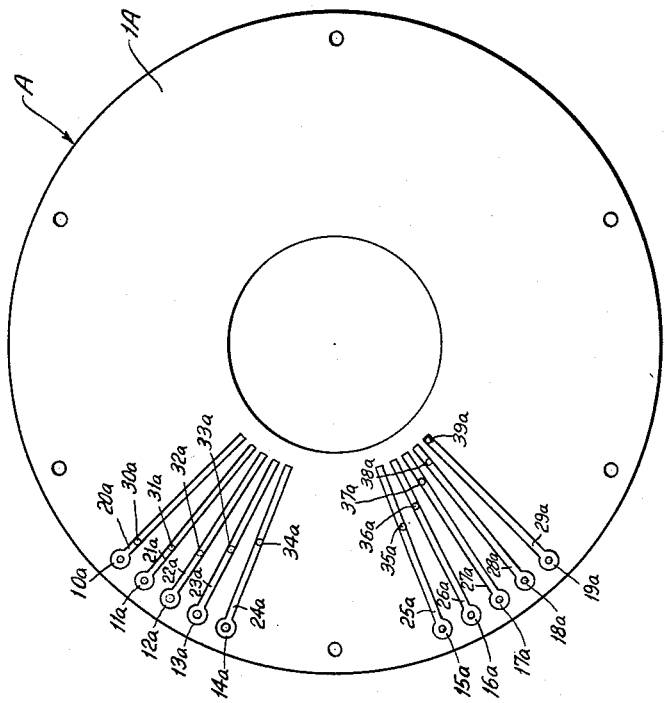
Fig. 4 is a plan view of the inner face of a bus plate component.
Figure 3:
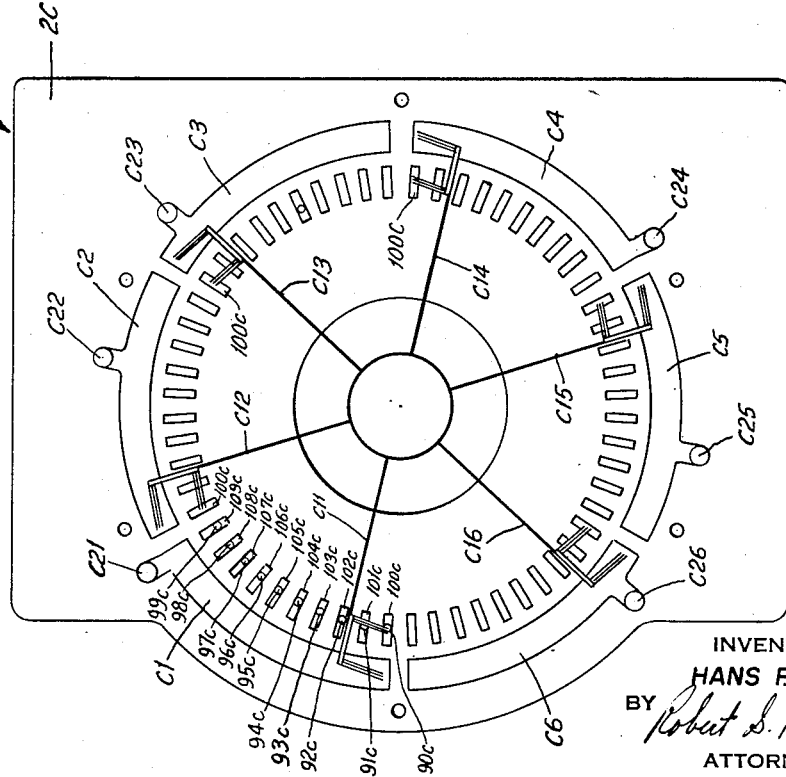
Fig. 3 is a plan view of the outer face of a pluggable wiper plate constituting a component of the distributor.

The distributor herein consists of three components adapted to be joined into a unitary structure. Each component of the distributor herein has been illustrated as consisting of a relatively thin flat sheet of insulating material having formed on opposite inner and outer faces thereof current conducting paths, the paths of one face being spaced from and overlying in intersecting relation those of another face, so that various circuits may be established through the element. The designation "inner" and "outer," as used herein, is an arbitrary one and resort is had thereto merely to facilitate this exposition. The terms "current conducting paths" and "circuit paths" as herein used refer to an electrical conductor which is printed, sprayed, or otherwise deposited on its base as by the use of liquified metal, powdered metal, or powdered metal in suspension in a liquid carrier.

Specifically, the distributor includes a bus plate component A, a circuit pattern disk component B, and a pluggable wiper plate component C which may be referred to as a connector plate. The inner face 1C of the pluggable wiper plate has arranged thereon a plurality of circuit paths 10c–19c for receiving electrical impulses. Each of the paths 10c–19c terminates at its inner end in a contact head adapted to lie in contact with transverse conducting plugs 10b–19b provided in corresponding positions along a peripheral edge of the circuit pattern disk B. The outer ends of the paths 10c–19c may be electrically connected to a conductor by using a connecting plug such as that shown in the C. D. Lake U. S. Patent No. 2,401,430.

Adapted to lie in contact with the transverse conducting plugs 10b–19b are correspondingly positioned peripheral transverse conducting plugs 10a–19a in the bus plate A.

The transverse conducting plugs 10a–19a which open into the inner face 1A of the bus plate A are in electrical contact with radially disposed circuit paths 20a–29a, which are arranged in two groups of five each on the inner face 1A of the bus plate. It follows, therefore, that when current is impressed on any of the inlet paths 10c–19c disposed on the face 1C of the pluggable wiper plate C, such current will be conducted through the transverse conducting plugs 10b–19b, 10a–19a, which extend through the circuit pattern disk B and the bus plate A, respectively. Consequently, the radially disposed conducting paths 20a–29a on the inner face 1A of the bus plate will be energized. From this point the impulses may be distributed in a predetermined manner, as shall appear from the following:

The outer face 2A of the bus plate A has arranged thereon a plurality of mutually insulated circular conducting paths concentrically arranged so that each overlies in intersecting position radial circuit paths on the opposite face of the component.

There has been illustrated herein ten concentrically arranged circular paths 40a–49a for the further passage of electrical impulses that may have been impressed on the oppositely disposed radial paths 20a–29a. The current impressed on any one of the radial paths 20a–29a may be imposed on any one of the oppositely disposed intersecting paths 40a–49a, but for the purpose of orderly description it will be assumed that the radially disposed paths 20a–29a on the inner face 1A of the bus plate will be connected in respective order to the circular paths 40a–49a on the outer face of the plate. Accordingly, a series of transverse conducting plugs 30a–39a have been arranged at the point at which a radial path on one face of the plate intersects its paired circular path on the opposite side of the face. Thus, radial path 20a is connected with the circular path 40a by means of a transverse connection 30a. Similarly, the radial path 21a is connected to the circular path 41a by means of a transverse connection 31a. In like fashion, each succeeding radial path remaining in the series 22a–29a will be connected to the remaining circular paths in the series 42a–49a by means of transverse connections 32a–39a.

The outer face 2A of the bus plate component is adapted to lie in close contact with the inner face 1B of the circuit pattern disk component, and accordingly, the face 1B of the circuit pattern disk component has been provided with a plurality of circularly disposed current paths corresponding in position to those of the circular paths on the face 2A of the bus plate. Specifically, the face 1B of the circuit pattern disk component has arranged thereon ten mutually insulated circular paths 50b–59b, which lie in contact and functionally cooperate with the circular circuit paths 40a–49a, respectively, of the confronting face 2A of the bus plate component when the two faces are placed in contacting position.

When two components are pressed into face-to-face relationship, the respective circuit paths of one face is common to those of the confronting face. Therefore, the respective paths of one face combine functionally with the corresponding paths of the other face and thereby in effect constitute a single conductor. For clarity in description, however, each component herein is being described separately on a purely structural basis. Thereafter, the operative function of the elements as a whole will be more clearly understood. It follows, therefore, that an electrical impulse energizing any one of the circular circuit paths 50b–59b may be distributed from any point along the path. Such distribution is achieved by providing a transverse conducting connection at a selected point through the circuit pattern component B. The position of the transverse conducting connection will be determined by the positional order in which the impulse is to be discharged from the element. The outer face 2B of the circuit pattern disk component has provided thereon mutually insulated radial circuit paths that are divided on a functional basis into groups of ten paths each. Thus, a multiplicity of radial paths are arranged on the face 2B of the circuit pattern disk component constituting six contiguous groups 1b–6b. The grouping of the radial paths is in accordance with the position of a common discharge segment to be described at a later point herein.

In any event, for purpose of illustration, the radial group 1b is composed of ten radial paths 70b–79b. The transverse conducting connections provided in the circuit pattern disk component B are positioned along a circular path on the face 1B of the component to intersect a selected one of the radial paths 70b–79b in any one of the functional groups 1b–6b.

The outer face 2B of the circuit pattern disk component is adapted as hereinbefore suggested to lie in contact with the inner face 1C of the pluggable wiper plate component C, and this face of the component has, accordingly, arranged thereon mutually insulated radial circuit paths that are divided on a functional basis into groups of ten paths to each group to correspond to the arrangement of the radial paths on the face 2B of the circuit pattern disk component. It follows, therefore, that when the radial paths of the circuit pattern disk component B are in face-to-face relationship with the radial paths of the pluggable wiper plate component C, these paths will each in effect constitute a single electrical conductor. Specifically, the radial conducting paths 80c–89c are arranged in groups 1c–6c for the selective energization of any one of the paths, as will more particularly appear from the following:

Each of the radial paths 80c–89c has extending therethrough a transverse conducting connection, which effectively carries an electrical impulse imposed on the path to a contact point on the opposite or outer face of the pluggable wiper plate component.

Reference to the outer face 2C of the pluggable wiper plate component C will disclose circularly arranged contact points 100c–109c, which correspond in position to the respective radial paths on the inner face of the component. Herein it is shown that the transverse conducting plugs 90c–99c electrically join their respective radial paths 80c–89c with the corresponding contact points 100c–109c of the same group. It will be observed that each functionally separate group of contact points 100c–109c is associated with an adjacent common bus segment C1–C6. Six such segments C1–C6 are provided on the face 2C of the pluggable wiper plate component. Each segment C1–C6 has its respective transverse connection C21–C26, which extends to the inner face of the pluggable wiper plate component for contact with discharge leads C31–C36, respectively, which are formed on the inner face 1C of the pluggable wiper plate component.

The face 2C of the wiper plate component has arranged thereon a brush having contact arms C11–C16, which are disposed from a rotatable hub in fixed relation to each other. The brushes C11–C16 are adapted to bridge the segments C1–C6, and any one of the contact points 100c–109c associated therewith. Consequently, any impulse that may be present at the face of a contact point, which is connected to its respective segment, will be carried into the segment and thus through the associated discharge conduit on the opposite face of the plate.

The distribution is adapted, for example, to the storage and transmission of trigonometric values, such as the various functions of arcs or angles, or for the storage of recurring statistical data for later integration into electrically operated computing devices and the like. The function of the distributor may best be understood by resort to example. Let it be assumed that the distributor is to be used as a sine reference, for example, sine 39° (6293).

The input paths 10c–19c are connected to an impulsing device, which impresses sequential electrical impulses on the respective paths in, let it be assumed, ascending order. Consequently, each path may be represented as a digit in regular order. Therefore, paths 12c, 13c, 16c and 19c will receive impulses at the second, third, sixth and ninth point of the timed impulsing cycle. Current impressed on the path 12c along the face 1C of the pluggable wiper plate component is transversely transmitted through the transverse connection 12b in the periphery of the circuit pattern disk component B and also through the transverse connection 12a of the bus plate component A. The radial path 22a disposed on the face 1A of the bus plate component A will be energized. The impulse on the radial path 22a will be carried back to the opposite face 2A of the bus plate component by way of the transverse connection 32a. The transverse connection 32a is in electrical contact with the circular circuit path 42a disposed on the outer face 2A of the bus plate component, and therefore, the circular path 42a will be energized. Since the face 2A of the bus plate component is in contact with the face 1B of the circuit pattern disk component and forms therewith a common carrier, the circular path 52b on the face 1B of the circuit plate component will be energized.

The point in the order in which the current impressed on the circular path 52b will be discharged from the unit is determined by the position of the transverse conducting connection extending through the circuit pattern component, and therefore, reference should be had to the position of the digit "2" in the example being used. Since the digit "2" occupies the second position of the example, it must be arranged to discharge the impulse from the second discharge conduit, since these discharge conduits are connected in regular order to the instrumentalities of a group that are controlled thereby.

In order to accomplish this result, it will be necessary to bring a transverse connection 62b into intersecting relation to a selected one of the radial paths 70b–79b of the functional group 2b on the outer face 2B of the circuit pattern component. Assuming that it is desired to energize the contact point 100c of the group 2b, it will be necessary to position the transverse conducting connection 62b so that it will intersect the oppositely disposed radial path 70b of the functional group 2b. Upon such arrangement, the radial path 70b of the functional group 2b will be energized, and it remains thereafter only to connect the energized radial path with its corresponding contact point 100c on the outer face of the circuit pattern disk component. Such connection is achieved by the transverse connecting plug 90c, which extends through the pluggable wiper plate component in intersecting position with reference to the radial conducting path 80c of group 2c on the inner face thereof. Consequently, the contact point 100c associated with the bus segment C2 will be energized and by virtue of the brush C12 current will be imposed on the segment C2, and such current then follows transversely through the pluggable wiper plate component at the transverse connection C22, which lies in contact with the discharge channel C32, this channel being connected to an instrumentality in the second position of the order in which it is arranged.

The remaining impulses are translated in similar fashion. Thus, the third timed impulse enters the connection 13c, flows along the transverse connector 13b, the transverse connector 13a, the radial path 23a, the transverse connector 33a, the circular path 43a—53b, the transverse connector 63b, into the radial path 80c of the functional group 4c, through the transverse connector 90c, into the contact point 100c of the associated segment C4, through the transverse connector C24, and into the outlet conduit C34, thereby energizing the instrumentality of the fourth position.

The inlet path 16C is next energized in regular order, and the current thereof flows through the transverse connectors 16b—16a, along the radial path 26a, through the transverse connector 36a for energizing the circular paths 46a—56a, from which it is led transversely through the circuit pattern disk at the transverse connector 66b for energizing the radial path 70b of the functional group 1b, the radial path 70b—80c of the functional groups 1b and 1c, respectively. The impulse passes transversely through the pluggable wiper plate component to energize the contact point 100c, which is associated with the segment C1, and consequently, the path continues through the transverse connector C21 for energizing the outlet conduit C31, which is in connection with the first instrumentality of the order under control.

The impulse at the ninth point of the impulsing cycle is impressed on the inlet path 19c and follows transversely through the connectors 19b and 19a for energizing the radial path 29a, which has disposed at its inner end the transverse connector 39a lying in contact with the circular path 49a, thereby energizing the path 49a—59b. The path then lies through the transverse plug 69b on the circuit pattern component B. This transverse path is disposed in intersecting relation to the radial circuit path 70b of the group 3b on the opposite side of the plate, thereby energizing the radial path 70b—80c of that particular group. The current flows through the transverse connector 90c, thereby energizing the contact point 100c, which is associated with the segment C3. By virtue of connection by the brush C13, the segment C3 is energized, and consequently, current thereon flows through the transverse connector C23 into the discharge conduit C33 for the control of an instrumentality of the third position of the controlled group.

Figure 9:
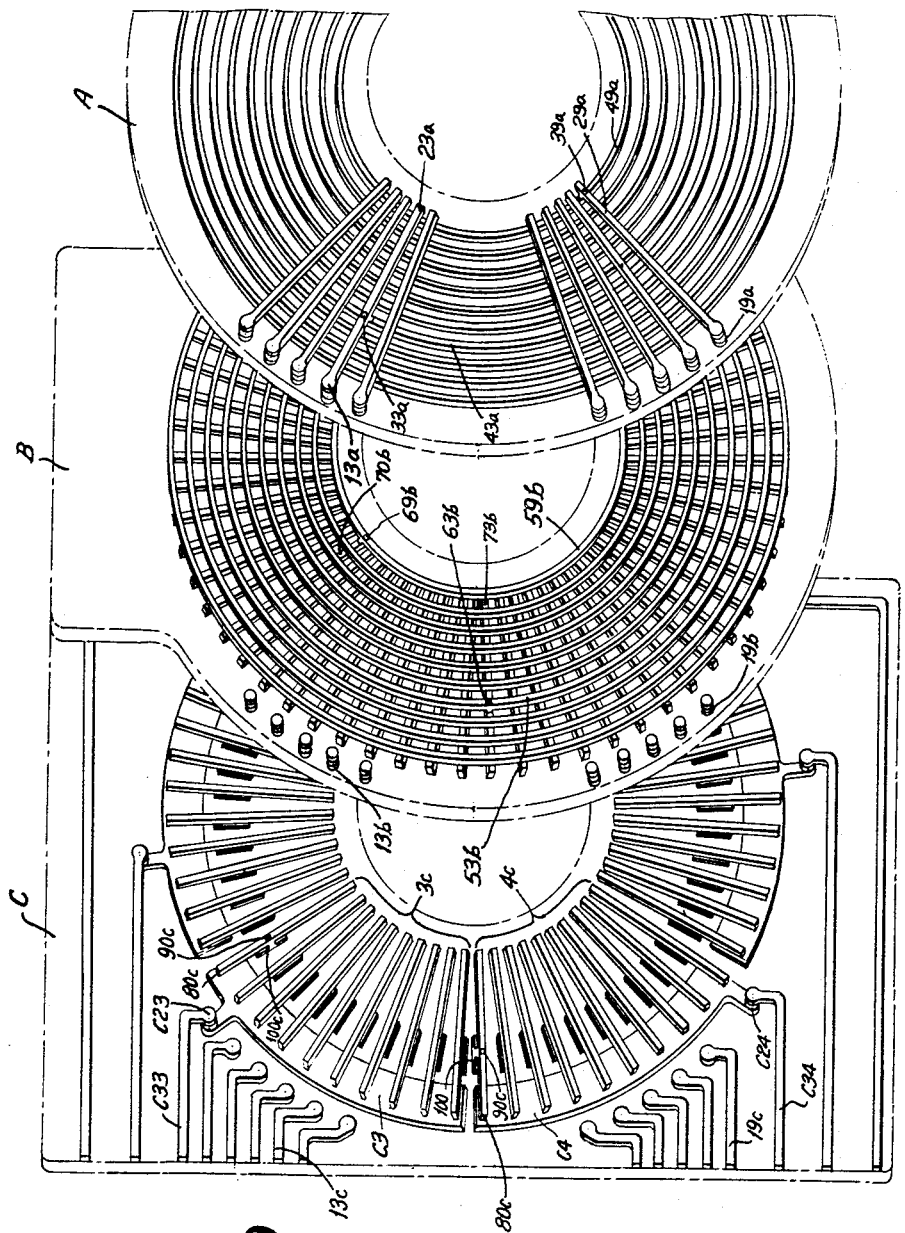
Fig. 9 is a more or less diagrammatic phantom view showing three distributor components in overlapping relation.

Figure 9 of the drawing is a somewhat diagrammatic phantom view of the distributor, and reference to this figure in connection with an example may serve to more clearly demonstrate the structure and function of the device. Herein the components A, B and C have been shown in overlapped relation to permit circuits through the component to be followed with greater ease. For purpose of example, only the digits "3" and "9" of the foregoing example will be utilized. It will be observed that the third impulse is to be transposed to the fourth position. Consequently, this impulse is received by path 13c, is transmitted transversely through connections 13b and 13a in components B and A, respectively, for energizing the radial path 23a. The return path of the impulse is through transverse connection 33a, circular path 43a—53b, transverse connection 63b, radial path 73b—80c, transverse connection 90c, contact point 100c of the functional group 4c, through a brush (not shown) connecting the contact 100c with the segment C4, through return connection C24, and out through conduit C34, which is disposed in the fourth position and connected to the fourth instrumentality of an ordered group.

The ninth impulse will enter on path 19c, travel transversely through connections 19b and 19a, and into the radial path 29a. The return path then follows through the transverse connection 39a, circular paths 49a—59b, the transverse connection 69b, into the radial paths 70b—80c, the transverse connection 90c, and into the contact point 100c of the radial group 3c. Thence the current is carried through a connecting brush from the contact 100c into the common conductor segment C3, along return connection C23, and into the discharge path C33, which occupies the third position, and consequently, controls the third instrument of an ordered group.

It should be particularly noted that the pluggable wiper plate and the bus plate may be of fixed design and structure. Thus, for whatever translating function the element is designed, the transverse conducting connections C21—C26, which extend through wiper plate component C, and the circuit paths thereon have a fixed position. In similar fashion, the bus component A may be of fixed structure. Therein the transverse conducting connections 30a—39a and the circuit paths on the faces thereof may occupy the same position for all structures. Likewise, the peripheral transverse conducting members extending from the inner ends of the input paths 10c—19c to the outer face of the bus component A may be invariable. The circuit paths on the faces of the pattern disc component B may also conform to a fixed pattern for all embodiments. It follows, therefore, that all possible impulse transposing functions can be attained by merely selectively positioning the transverse conducting connections 61b—69b, which extend through the circuit pattern component B. From the foregoing it will be clear that a simple method for the manufacture and assembly of a fixed impulse transposing unit has been provided.

The invention contemplates not only a distributor structure, but a method for the manufacture of such element and component parts thereof. Figures 10 through 16 of the drawing illustrate certain elements and steps employed in the process of manufacturing.

It is contemplated that all circuit paths forming a part of the element be deposited on a receiving base, so that the path in effect becomes a part of the base. It has been known heretofore to provide electrical circuits by painting, spraying or printing a metallic ink, paint or liquid composition on the surface of a non-conducting sheet, and in general, the method herein involved contemplates certain improvements on the methods heretofore used. The term "deposited," as herein used, is to be taken, therefore, in its broad sense to embrace painting, printing, spraying or otherwise applying to a base component a current conducting coating in the form of circuit paths.

In brief, one specific practice of the method involves the application of a mask or template to opposite sides of a non-conducting component sheet and the formation of circuit paths upon such non-conducting component sheet by spraying against the opposite faces thereof a metal fog or mist produced by projecting molten metal from a nozzle under suitable fluid pressure.

Any more or less liquid conducting composition may be employed for depositing the circuit paths. For example, a metallic ink can be employed and such deposits may be subsequently electroplated with an appropriate material to form a deposit of substantial thickness and one having the desired strength and capacity.

There is available a coating composition consisting of a finely powdered metal with a quick drying resinous binder. Such compositions may be employed for spraying, painting or otherwise depositing the circuit paths. The latter compositions are particularly adapted for screen printing the circuit paths on to the dielectric base plates of the components. Circuit paths so deposited may be quickly dried by subjecting them to a temperature sufficiently high to volatilize the liquifying constituent.

The formation of parts of the circuits which are subject to mechanical wear are best formed by the spraying of metal because of the tough, wear-resisting quality of such sprayed surfaces. However, less wear-resistant circuits may be traced on parts of the element that are not subject to mechanical wear, and for such circuits metallic paints, inks and other conducting coating compositions may be employed with advantage.

Furthermore, it is contemplated that the circuit paths may be deposited on the insulating base of the components by sputtering or vapor transfer of metal under a vacuum. For the purpose of such procedures, the base plates are first conditioned by defining the portions on which the circuits are to be deposited by rendering such portions conductive and by the use of a mask, respectively, so that the metal will adhere only to the areas so conditioned.

In Figure 10 is illustrated a mask 300, having therein a plurality of slots 302, which represent a circuit pattern sought to be deposited on the face of a circuit component sheet. Figure 12 shows a mask 304, which is generally similar to that shown in Figure 10, but wherein the slots 306, which are representative of the circuit to be deposited, are of a different form. A relatively thin yielding sheet of non-conducting material 308 of any desired shape or dimensions may be used as the base of the component on which circuit paths are deposited in accordance with the method. The deposition of the circuit forming paint or composition is preferably accomplished by spraying the composition in the predetermined patterns, as governed by the masks 300 and 304. Accordingly, the component base 308 is positioned between a pair of masks, such as 300 and 304, the masks being of sufficient size to cover all of the working area of the component base and being slotted according to the predetermined pattern, which is to constitute the deposited circuit path on opposite faces of the component base. After assembly of the masks with the component base sheet, the metal or other liquid or semi-liquid conducting composition may be sprayed or otherwise deposited against opposite faces of the component base, as diagrammatically represented in Figure 13 of the drawing.

After the spraying operation has been completed the deposited conducting circuit paths are disposed on the component base in relief, as indicated at 310 and 312 in Figure 14 of the drawing. For certain purposes, particularly in connection with the use of a wiper brush or the like that has mechanical contact with and regular or intermittent movement in contact with such deposited part, it is desirable that the circuit path be wholly within the plane of the component base and preferably flush with the facial surface thereof to avoid undue wear of the contacting surfaces. A satisfactory position of the circuit paths is shown in Figure 15, wherein the paths 310 and 312 are flush with the face of the component base 308. This objective is achieved by selecting a compressible component base and pressing the circuit paths into the base by subjecting the components to pressure after the paths have been deposited thereon. In a specific practice of this phase of the method, it has been found that a suitable component base is a partially cured phenol condensate sheet possessing the necessary yielding characteristic to permit the circuit paths to be pressed into the face of the base. Since the specific base material is of no consequence so long as it is a non-conductor of electricity and possesses a yielding quality, a choice of such materials is available to those skilled in the art. For example, the component base may be a sheet or block of cellulose acetate or acrylic resin. The material employed may be either thermo-plastic or thermo-setting so long as the essential properties are present.

When a partially cured phenol condensate base is employed, it is appropriate to press the sprayed plate while applying heat to effect the further and complete curing thereof. Herein it is contemplated, therefore, that the components be compressed at a temperature of 300° to 350° F. and under a pressure of 1000 to 2000 pounds per square inch, as, for example, in a press 314, such as diagrammatically and partially illustrated in Figure 16 of the drawing. A press of this type will include as essential elements a pair of press plates 316, which may be provided with heating means, such as steam coils or electric resistance heaters, 318. Higher pressures may be employed, but for successful operation at substantially higher pressures it may become necessary to use a mold to confine the lateral movement of the base material.

The smooth, flush position of the path obtained by pressing the sprayed components is only one of the benefits flowing from the exercise of this part of the method. As hereinbefore shown, the electrical circuit element includes a plurality of components which have on confronting faces circuit paths that occupy a common position, and which, therefore, lie in contact with each other when two or more components are placed in face-to-face relationship. It will be appreciated, therefore, that the pressing of a plurality of components will more effectively unite common conducting paths, so that such common paths will function as a single path. When using a compressible component base material, as, for example, semi-cured phenol condensate, pressing of a plurality of components in face-to-face contact under heat and pressure will result in the flowing together of fusing of the separate component base members into such intimate relation as to form a unitary structure, such structure being in effect a single multi-circuit carrying body of homogenous character.

Figure 17:
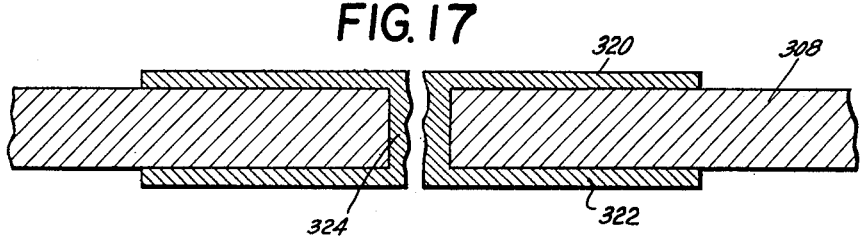
Fig. 17 is an enlarged fragmentary sectional view of a component showing the nature of a transverse impulse conducting path formed therein.
Figure 18:
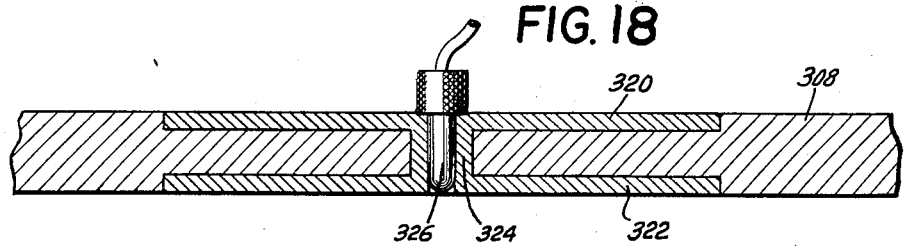
Fig. 18 is an enlarged fragmentary cross-sectional view through a component showing the manner in which transverse conducting paths may be plugged.
Figure 19:
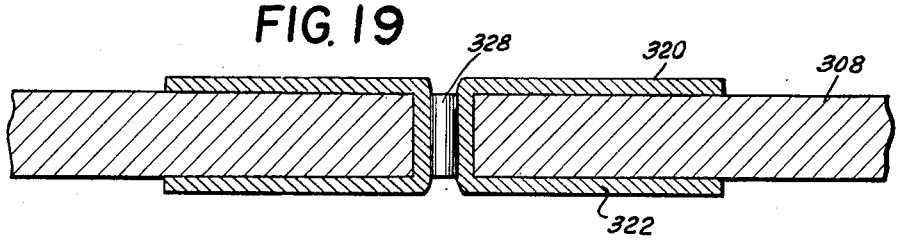
Fig. 19 is a fragmentary cross-sectional view through an element prior to compression thereof and shows in the transverse passage a forming pin.

It has been pointed out hereinbefore that the transverse connections, which electrically join intersecting circuit paths on opposite faces of a component, are formed by piercing the base of the component from face-to-face and by spraying or otherwise depositing an electrically conductive composition on the walls of the transverse passage. It is sometimes desirable that a transverse connector, whether interconnecting oppositely disposed circuit paths or not, be adapted to receive a connecting plug. Without exercising specific precaution to render the transverse connection pluggable, the passage leading from one face of a component to another may be partially or completely blocked by the conducting composition during the spraying operation. Such condition is particularly prevalent after subjecting the component to pressure. In Figure 17 is shown a section of a component base 308, having deposited thereon oppositely disposed circuit paths 320 and 322. Herein a transverse connecting passage has been formed in the base 308 by piercing the base in the zone of oppositely disposed circuit paths 320 and 322. Thereafter the conducting material has been sprayed into the passage forming an interconnecting annulus 324 therein. The shape and position of the inner walls of the annulus 324 are normally beyond accurate control, and it frequently happens, particularly after the element has been compressed, that the transverse passage is completely obliterated, whereas the desired condition, as shown in Figure 18, is one in which the walls of the annulus 324 remain substantially cylindrical for the ready reception of a conducting plug 326.

Figure 20:
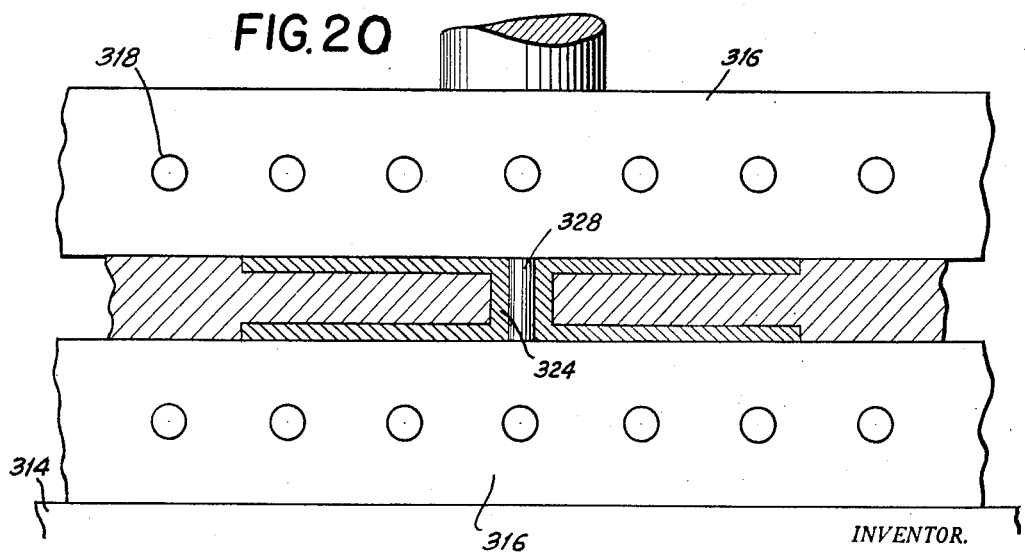
Fig. 20 is a fragmentary sectional view through a pair of press plates showing the condition of the component of Fig. 19 after application of pressure.

The desired condition can best be brought about by inserting a forming element such as a plug into the passage prior to the pressing operation. Thus, a plug 328 may be inserted into the passage before the component is subjected to pressure, and as seen from Figure 20 of the drawing, when a component so conditioned is placed between the plates 316 of the press 314 and subjected to pressure therebetween, the plug 328 will serve to form a connecting transverse passage having cylindrical walls 324, which are adapted to the plugging function referred to.

The procedure shown in Figures 17 through 20 of the drawing is, of course, simply for the purpose of suggesting the steps that may be used to achieve the purpose, and any suitable or feasible procedure may be resorted to, so long as a sustaining element is used in the through passage for molding and shaping the walls of the passage during the pressing operation. It is contemplated that the forming elements or plugs 328 be adapted for mechanical manipulation as, for example, by incorporating them into the base or head platen of the press 314.

The practice of the invention in its several aspects has been shown and described herein in single embodiments merely for the purpose of rendering concise the explanation thereof. Certain modifications have been alluded to for the purpose of suggesting the broader aspects. It is intended, therefore, to be limited only as indicated by the scope of the following claims.

What is claimed is as follows:

1. A distributor composed of a plurality of plate-like non-conducting components having circuit paths deposited on opposite faces thereof comprising, a connector plate component having input, output, and distributing paths on the inner face thereof, and impulse distributing paths on the outer face thereof, means extending through said component connecting certain of said distributing paths with paired output paths, a bus component having current paths on the opposite faces thereof, a circuit pattern component interposed between said connector component and said bus component, circuit paths on the opposite faces of said circuit pattern component common respectively to the paths on the confronting faces of the bus component and the connector component, the circuit paths on the opposite faces of said bus and pattern components being so arranged respectively that a transverse projection of any circuit path on one face thereof intersects all of the circuit paths on the opposite face thereof, means connecting the input leads of the connector component with the paths on the inner face of said bus component, and connections, including selective paths through said circuit pattern component, for conducting impulses to predetermined ones of the distributing paths on the outer face of said connector component.

2. A distributor composed of a plurality of plate-like non-conducting components having circuit paths deposited on opposite faces thereof comprising, a connector plate component having input, output, and distributing paths on the inner face thereof, a plurality of groups of impulse distributing paths and a common distributing segment associated with each group of distributing paths on the outer face thereof, means extending through said component connecting said segments with paired output paths, means connecting a selected path of said group with its associated segment, a bus component having current paths on the opposite faces thereof, and a circuit pattern component interposed between said connector component and said bus component, circuit paths on opposite faces of said circuit pattern component common respectively to the paths on the confronting faces of the bus component and the connector component, the circuit paths on the opposite faces of said bus and pattern components being so arranged respectively that a transverse projection of any circuit path on one face thereof intersects all of the circuit paths on the opposite faces thereof, means connecting the input leads of the connector component with the paths on the inner face of said bus component, and connections, including selective paths through said circuit pattern component, for conducting impulses to predetermined ones of the distributing paths on the outer face of said connector component.

3. A distributor composed of a plurality of plate-like non-conducting components having circuit paths deposited on opposite faces thereof comprising, a connector plate component having input, output, and distributing paths on the inner face thereof, a plurality of groups of impulse distributing paths and a common distributing segment associated with each group of distributing paths on the outer face thereof, means extending through said component connecting said segments with paired output paths, a contact device for connecting a single distributing path of one group with its common segment, said means including relatively fixed contact arms for each distributor segment, a bus component having current paths on the opposite faces thereof, a circuit pattern component interposed between said connector component and said bus component, circuit paths on opposite faces of said circuit pattern component common respectively to the paths on the confronting faces of the bus component and the connector component, the circuit paths on the opposite faces of said bus and pattern components being so arranged respectively that a transverse projection of any circuit path on one face thereof intersects all of the circuit paths on opposite faces thereof, means connecting the input leads of the connector component with the paths on the inner face of said bus component, and connections, including selective paths through said circuit pattern component, for conducting impulses to predetermined ones of the distributing paths on the outer face of said connector component.

4. A distributor composed of a plurality of plate-like non-conducting components having circuit paths deposited on opposite faces thereof comprising, a connector plate component having input, output, and distributing paths on the inner face thereof, a plurality of groups of impulse distributing paths, and a common distributing segment associated with each group of distributing paths on the outer face thereof, means extending through said component connecting said segments with paired output paths, a bus component having current paths on the opposite faces thereof, a circuit pattern component interposed between said connector component and said bus component, circuit paths on opposite faces of said circuit pattern component common respectively to the paths on the confronting faces of the bus component and the connector component, the circuit paths on the opposite faces of said bus and pattern components being so arranged respectively that a transverse projection of any circuit path on one face thereof intersects all of the circuit paths on the opposite faces thereof, means connecting the input leads of the connector component with the paths on the inner face of said bus component, connections, including selective paths through said circuit pattern component for conducting impulses to predetermined ones of the distributing paths on the outer face of said connector component, and a rotatable contact device, including relatively fixed contact arms for each distributor segment connecting a single selected distributing path of one group with its common segment.

5. The method of making an electrical circuit element, which consists in depositing a plurality of mutually insulated circuit paths of a common pattern on one face of a plurality of base components, depositing on the opposite face of the components a plurality of mutually insulated circuit paths of a different common pattern, the circuit paths on the opposite faces of said base components being so arranged respectively that a transverse projection of any circuit path on one face thereof intersects all of the circuit paths on the opposite faces thereof, assembling said components in face-to-face relation with circuit paths of a common pattern in contact with each other, providing transverse connections between selected oppositely disposed paths, and subjecting the assembly to pressure.

6. The method of making an electrical circuit element, which consists in depositing a plurality of mutually insulated circuit paths of a common pattern on one face of a plurality of yielding base components, depositing on the opposite face of the components a plurality of mutually insulated circuit paths of a different common pattern, the circuit paths on the opposite faces of said base components being so arranged respectively that a transverse projection of any circuit path on one face thereof intersects all of the circuit paths on the opposite faces thereof, assembling said components in face-to-face relation with circuit paths of a common pattern in contact with each other, providing transverse connections between selected oppositely disposed paths, and subjecting the assembly to pressure.

7. The method of making an electrical circuit element, which consists in depositing a plurality of mutually insulated circuit paths of a common pattern on one face of a plurality of partially cured thermo-setting base components, depositing on the opposite face of the components a plurality of mutually insulated circuit paths of a different common pattern, the circuit paths on the opposite faces of said base components being so arranged respectively that a transverse projection of any circuit path on one face thereof intersects all of the circuit paths on the opposite face thereof, assembling and fixing said components in face-to-face relation with circuit paths of a common pattern in contact with each other, providing transverse connections between selected oppositely disposed paths, and subjecting the assembly to heat and pressure.

8. The method of making an electrical circuit element, which consists in forming identical circuit paths of a linear nature on a plurality of base components, assembling such components in face-to-face relation with the circuit paths of one base component in linear contact with the circuit paths of another base component throughout the length thereof, and then joining the contacting faces of such components in such intimate relation as to form thereof a unitary circuit carrying body.

9. The method of making an electrical circuit element, which consists in forming identical circuit paths of a linear nature on a plurality of heat curable base components, assembling such components in face-to-face relation with the circuit paths of one base component in linear contact with the circuit paths of another base component throughout the length thereof, and then heating the assembled components to join the contacting faces thereof in such intimate relation as to form a unitary circuit carrying body.

10. The method of making an electrical circuit element, which consists in forming identical circuit paths of a linear nature on a plurality of pressure responsive base components, assembling such components in face-to-face relation with the circuit paths of one base component in linear contact with the circuit paths of another base component throughout the length thereof, and then subjecting said assembled components to sufficient pressure to join the contacting faces in such intimate relation as to form thereof a unitary circuit carrying body.

11. The method of making an electrical circuit element, which consists in forming identical circuit paths of a linear nature on a plurality of heat curable and pressure responsive base components, assembling said components in face-to-face relation with the circuit paths of one base component in linear contact with the circuit paths of another base component throughout the length thereof, and then applying heat and pressure to said assembled components to join the contacting faces thereof in such intimate relation as to form a unitary circuit carrying body.

12. A distributor composed of a plurality of non-conducting base sheets, a plurality of mutually insulated circuit paths of a common pattern deposited on one face of said sheets, a plurality of mutually insulated circuit paths of a different common pattern deposited on the opposite face of said sheets, the circuit paths on the opposite faces of said base sheets being so arranged respectively that a transverse projection of any circuit path on one face thereof intersects all of the circuit paths on the opposite face thereof.

conductors extending through said sheets for connecting selected paths on one face thereof with selected paths on the opposite face thereof, and means joining said base sheets together in face-to-face contact with conducting paths of a common pattern in linear contact with each other.

HANS P. LUHN.

References Cited in the file of this patent

UNITED STATES PATENTS

| Number | Name | Date |
|---|---|---|
| 1,176,178 | Straub | Mar. 21, 1916 |
| 1,618,021 | Nenno | Feb. 15, 1927 |
| 1,647,474 | Seymour | Nov. 1, 1927 |
| 1,689,348 | Kuhn | Oct. 30, 1928 |
| 1,718,993 | Wermine | July 2, 1929 |
| 1,837,678 | Ryder | Dec. 22, 1931 |
| 1,892,146 | Harshberger | Dec. 27, 1932 |
| 2,066,511 | Arlt | Jan. 5, 1937 |
| 2,427,144 | Jansen | Sept. 9, 1947 |
| 2,431,393 | Franklin | Nov. 25, 1947 |
| 2,447,541 | Sabee | Aug. 24, 1948 |
| 2,474,988 | Sargrove | July 5, 1949 |
| 2,502,291 | Taylor | Mar. 28, 1950 |

FOREIGN PATENTS

| Number | Country | Date |
|---|---|---|
| 602,492 | Great Britain | May 27, 1948 |
| 686,445 | France | July 25, 1930 |